(12) United States Patent
Young et al.

(10) Patent No.: US 6,473,508 B1
(45) Date of Patent: Oct. 29, 2002

(54) AUTO-RECOVERABLE AUTO-CERTIFIABLE CRYPTOSYSTEMS WITH UNESCROWED SIGNATURE-ONLY KEYS

(76) Inventors: Adam Lucas Young, 535 W. 110th St., Apt. 12J, New York, NY (US) 10025; Marcel Mordechay Yung, 605 W. 112th St., Apt. 4H, New York, NY (US) 10025

( * ) Notice: Subject to any disclaimer, the term of this patent is extended or adjusted under 35 U.S.C. 154(b) by 0 days.

(21) Appl. No.: 09/218,219

(22) Filed: Dec. 22, 1998

(51) Int. Cl.[7] .................................................. H04K 1/00
(52) U.S. Cl. .......................................... 380/30; 380/286
(58) Field of Search ................................ 380/286, 277, 380/44; 713/155–156, 168

(56) References Cited

U.S. PATENT DOCUMENTS

| | | | |
|---|---|---|---|
| 4,200,770 A | 4/1980 | Hellman et al. | |
| 4,218,582 A | 8/1980 | Hellman et al. | |
| 4,405,829 A | 9/1983 | Rivest et al. | |
| 4,424,414 A | 1/1984 | Hellman et al. | |
| 4,625,076 A | 11/1986 | Okamoto et al. | |
| 4,641,346 A | 2/1987 | Clark et al. | |
| 4,748,668 A | 5/1988 | Shamir et al. | |
| 4,881,264 A | 11/1989 | Merkle | |
| 4,933,970 A | 6/1990 | Shamir | |
| 4,995,082 A | 2/1991 | Schnorr | |
| 5,005,200 A | 4/1991 | Fischer | |
| 5,097,504 A | 3/1992 | Camion et al. | |
| 5,231,668 A | 7/1993 | Kravitz | |
| 5,276,737 A | 1/1994 | Micali | |
| 5,315,658 A | 5/1994 | Micali | |
| 5,557,346 A | 9/1996 | Lipner et al. | |
| 5,557,765 A | 9/1996 | Lipner et al. | |
| 5,633,928 A | 5/1997 | Lenstra et al. | |
| 5,633,929 A * | 5/1997 | Kaliski, Jr. ................. | 380/286 |
| 5,640,454 A | 6/1997 | Lipner et al. | |
| 5,647,000 A | 7/1997 | Leighton | |
| 5,796,830 A | 8/1998 | Johnson et al. | |
| 5,815,573 A | 9/1998 | Johnson et al. | |

OTHER PUBLICATIONS

Schneier, Bruce. Applied Cryptography: Protocols, Algorithms, and Source Code in C. 10/95. sections 2.6 and 19.6.*
R. Anderson, M. Roe, "The GCHQ Protocol and Its Problems", Eurocrypt '97, pp. 134–148, Springer–Verlag, 1997.

(List continued on next page.)

*Primary Examiner*—Gail Hayes
*Assistant Examiner*—Ho S. Song
(74) *Attorney, Agent, or Firm*—Schweitzer Cornman Gross & Bondell LLP

(57) ABSTRACT

A method is provided for digital signature infrastructure that provides public keys which are effective only for verifying digital signatures, and are not effective for encrypting information in a way that is unrecoverable by law-enforcement entities. The method can be implemented in software, thus avoiding the need for tamper-proof hardware. The method has the property that signing private keys are not escrowed, since the corresponding public keys cannot be used effectively for criminal communications. As a result no one can impersonate the user; alternatively users can prove impersonations. Furthermore, the system is shadow public key resistant. A shadow public key is a public key which is not escrowed and which can be used for untappable communications. Therefore, the method presented here cannot be used to publish public keys which are not escrowed. All information displayed by the certificate authorities, and even the digital signatures of users, are shadow public key resistant. The present invention is usefull for any application that requires that messages be verifiably authentic, and is particularly applicable to being used in a national public key infrastructure (PKI), since it is very scalable. It can be combined with Auto Recoverable auto certifiable systems to give a complete solution to encryption (confidentiality) and signature (authentication) in the context of escrow key systems.

11 Claims, 5 Drawing Sheets

OTHER PUBLICATIONS

M. Belare, P. Ragaway, "Optimal Asymmetric Encryption", Eurocrypt '94, pp. 92–111, Springer–Verlag, 1994.

D. Chaum, "Blind Signatures For Untraceable Payments".

D. Chaum, T.P. Pedersen, "Wallet Databases with Observers".

D. Denning, D. Branstad, "A Taxonomy for Key Escrow Encryption Systems", Communications of the ACM, v.39, n. 3, 1996.

A. De Santis, Y. Desmedt, Y. Frankel, M. Yung, "How to Share a Function Securely", ACM STOC '94, pp. 522–533, 1994.

Y. Desmedt, Y. Frankel, "Threshold Cryptosystems", CRYPTO '89, pp. 307–315, Springer–Verlag, 1989.

Y. Desmedt, "Securing Traceability of Ciphertexts–Towards a Secure Software Key Escrow System", Eurocrypt '95, pp. 147–157, Springer–Verlag, 1995.

W. Diffie, M. Hellman, "New Directions in Cryptography", IEEE Transactions on Information Theroy, 22, pp. 644–654, 1976.

T. ElGamal, "A Public Key Cryptosystem and a Signature Scheme Based on Discrete Logarithms", CRYPTO '84, pp. 10–18, Springer–Verlag, 1985.

P. Feldman, "A Practical Scheme for Non–Interactive Verifiable Secret Sharing", 28th annual FOCS, pp. 427–437, 1987.

A. Fiat, A. Shamir, "How to Prove Yourself: Practical Solutions to Identification and Signature Problems", CRYPTO '86, pp. 186–194, Springer–Verlag, 1987.

Y. Frankel, M. Yung, "Escrow Encryption Systems Visited: Attacks, Analysis and Designs", CRYPTO '95, Springer–Verlag, 1995.

R. Ganesan, "How To Use Key Escrow", Communications of the ACM, v. 39, n. 3, p. 33, 1996.

S. Goldwasser, S. Micali, R. Rivest, "A Digital Signature Scheme Secure Against Adaptive Chosen–Message Attacks", SIAM Journal of Computing, vol. 17, n. 2, 1988.

IBM, SecureWay, key recovery technology document, available at http://www.ibm.com/Security/html/wp–keyrec.html (downloaded May 25, 1997).

N. Jefferies, C. Mitchell, M. Walker, "A Proposed Architecture for Trusted Third Party Services", Cryptography: Policy and Algorithms, LNCS 1029, Springer, 1996.

J. Killian, F. Leighton, "Fair Cryptosystems, Revisted", CRYPTO '95, pp. 208–221, Springer–Verlag, 1995.

L. Lacy, D. Mitchell, W. Schell, "CryptoLib: Cryptography in Software", AT&T Bell Labs, Crypto@research.att.com.

A. Lenstra, P. Winkler, Y. Yacobi, "A Key Escrow System with Warrant Bounds", CRYPTO '95, pp. 197–207, Springer–Verlag, 1995.

S. Micali, "Fair Public–Key Cryptosystems", CRYPTO '92, pp. 113–138, Springer–Verlag, 1992.

K. Nyberg, R. Rueppel, "Message Recovery for Signature Schemes Based on the Discrete Logarithm Problem".

T.P. Pedersen, "A Threshold Cryptosystme without a Trusted Party".

E. Verheul, H. Tilborg, "Binding ElGamal: A Fraud–Detectable Alternative to Key–Escrow Proposals", Eurocrypt '97, pp. 119–133, Springer–Verlag, 1997.

S. Walker, J. Winston, "Principles for Use of Encryption and Key Recovery", availalble at http://www.tis.com/docs/products/recoverkey/recoverykey.html(downloaded May 25, 1997).

A. Young, M. Yung, "Kleptography: Using Cryptography Against Cryptography", Eurocrypt '97, pp. 62–74, Springer–Verlag, 1997.

"Digital Systems", CRC Handbook of Applied Cryptography, Ch 11, pp. 425–444.

"Digital Systems", CRC Handbook of Applied Cryptograpy, Ch 11, pp. 445–464.

"Digital Systems", CRC Handbook of Applied Cryptography, Ch 11, pp. 465–481.

"Provably Secure and Practical Identification Schemes and Corresponding Signature Schemes", Tatsuaki Okamoto pp. 32–53.

Federal Register/vol. 62, No. 92/Tuesday, May 13, 1997/Notices, pp. 26293,26294.

* cited by examiner

AUTO-RECOVERABLE AUTO-CERTIFIABLE CRYPTOSYSTEMS WITH UNESCROWED SIGNATURE-ONLY KEYS

BACKGROUND—Field of Invention

The field of this invention is cryptography. This invention relates to digital signature schemes, and in particular to schemes that are compatible with any escrowed encryption system. The scheme introduces a public key/private key system in which the public key is auto-certifiable and is effective only as a digital signature verification key, and is not effective at performing unescrowed encryptions of data. Furthermore, the private signing key in the system is not escrowed. If the public key is ever used to encrypt data then that data is auto-recoverable by trusted authorities. The invention relates to cryptosystems implemented in software, but is also applicable to cryptosystems implemented in hardware. In particular the invention can be employed as the signature and authentication component in conjunction with escrowed encryption schemes.

BACKGROUND—Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. In the same paper by Diffie and Hellman the notion of a digital signature scheme was also proposed. A digital signature scheme allows a user to digitally "sign" a message using the private key known only to the user, to prove that the message comes from the user. To sign a message M, the user computes a signature using the private key D. The signature can then be verified using the public key E. A PKC and digital signature scheme based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

Since the present invention discloses a method for generating, publishing, and employing public key systems based upon a digital signature algorithm which is based on the problem of computing discrete logarithms, we will cite relevant prior art dealing with discrete log based signature schemes. The first space efficient digital signature scheme based on discrete logarithms is the Digital Signature Algorithm (U.S. Pat. No. 5,231,668). DSA gets its security from the difficulty of computing discrete logs modulo the prime p, where p is at least 512 bits in size. It also gets its security from the difficulty of computing discrete logs in a cyclic subgroup of order q, where q is a 160 bit prime divisor of p−1. DSA is novel in that the signatures that it outputs are 320 bits in length. Nyberg and Rueppel disclosed a set of ElGamal based variants that provide for message recovery (K. Nyberg, R. Rueppel, "Message Recovery for Signature Schemes Based on the Discrete Logarithm Problem, Eurocrypt '94, pages 182–193, 1994). The message recovery feature allows the message to be recovered from the signature itself, hence the message need not be sent along with the signature. Another important feature of digital signature schemes is blindability (D. Chaum, "Blind Signatures for Untraceable Payments", CRYPTO '82, pages 199–203). A scheme is blindable if it is possible for Alice to obtain a Bob's signature on a message of her choice such that Bob remains oblivious as to what he is signing and what the resulting signature is. In (D. Chaum, T. Pedersen, "Wallet Databases with Observers", CRYPTO '92, pages 89–105) a blindable scheme based on ElGamal is disclosed. A good overview of digital signature security is described in (S. Goldwasser, S. Micali, R. Rivest, "A digital Signature Scheme Secure Against Adaptive Chosen Message Attacks", SIAM J. Comput., vol. 17, n. 2, pages 281–308, 1988).

In the U.S. Patent Document entitled "Auto-Escrowable and Auto-Certifiable Cryptosystems" (by Young and Yung), a public key cryptosystem was disclosed that has the following properties. Users of the system can generate a public/private key pair and a certificate of recoverability. This certificate of recoverability can be used to both recover the private key by the escrow authorities, and verify that the private key is recoverable. The present invention draws many of its ideas from the Auto-Escrowable and Auto-Certifiable key escrow solution but concentrates on signature keys that have the feature that encryptions using the public verification key are auto-recoverable. Other methods for conducting key escrow are U.S. Pat. Nos. 5,276,737, and 5,315,658 which are due to Micali (1994). In these patents Micali discloses a Fair Public Key Cryptosystem (FPKC) which is based on the work of P. Feldman (28th annual FOCS). The FPKC solution is not as efficient in terms of use as Auto-Escrowable and Auto-Certifiable Cryptosystems. Furthermore, it has been shown that the Fair RSA PKC does not meet certain needs of law enforcement (J. Kilian, F. Leighton, "Fair Cryptosystems Revisited", CRYPTO '95, pages 208–221, Springer-Verlag, 1995, see also U.S. Pat. No. 5,647,000 to Leighton), since a shadow public key cryptosystem can be embedded within it. A shadow public key system is a system that can be embedded in a key escrow system that permits conspiring users to conduct untappable communications. Kilian and Leighton disclose a Fail-safe Key Escrow system. This system has the drawback that it requires users to engage in a multi-round protocol in order to generate public/private key pairs. Other key escrow systems with similar innefficiencies are by De Santis et al., Walker and Winston (TIS), and the IBM SecureWay document. A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system provides for session level key recoverability, and makes no provision for preventing users from encrypting messages prior to using the Binding ElGamal system. Hence, it permits conspiring criminals to conduct untappable communications. Both Binding ElGamal and the Auto-Escrowable and Auto-Certifiable Cryptosystems solutions employ the use of non-interactive zero-knowledge proofs. More specificly, they employ the Fiat Shamir heuristic which is disclosed in (A. Fiat, A. Shamir, "How to Prove Yourself: Practical Solutions to Identification and Signature Problems", CRYPTO '86, pages 186–194, Springer-Verlag, 1987). An overview of key escrow schemes appears in (D. Denning, D. Branstad, "A Taxonomy for Key Escrow Encryption Systems," Communications of the ACM, v. 39, n. 3, 1996). In (N. Jefferies, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage, and hence provides for another encumbersome solution as well. Such solutions are described in the TIS patent (U.S. Pat. Nos. 5,557,346, 5,557,765, and 5,640,454 to Lipner et al.) and the IBM patents (U.S. Pat. Nos. 5,796,830 and 5,815,573 to Johnson et al.). Adding time limits to keys is given in (U.S. Pat. No. 5,633,928 to Lenstra et al.).

The primary problem with implementing a digital signature scheme suitable for a national usage is that very often the public verifying key can be used as a public encryption key, and the corresponding private signing key can be used as a private decryption key. For law enforcment purposes it is therefore necessary to escrow the signing private keys. But this implies that law enforcement has the capability of forging signatures of users, and also impersonating users in interactive identification protocols. There is no legitimate reason that law enforcement should have this capability. Hence, what is needed is a public and private key system that is usable for digital signatures but not for public key encryptions. This problem was stated informally in a request for comments that was published in the Federal Register ("Announcing Plans to Revise Federal Information Processing Standard 186, Digital Signature Standard", vol. 62, n. 92, Federal Register, pages 26293–26294, May 13, 1997).

We will now give reasons why existing digital signatures schemes fail due to shadow public key vulnerabilities. Consider the ElGamal digital signature algorithm (T. ElGamal, "A Public-Key Cryptosystem and a Signature Scheme Based on Discrete Logarithms", CRYPTO '84, pages 10–18, Springer-Verlag, 1985). In ElGamal, the public key is $y=g^x$ mod p, where x is the private signing key. Here g is a public generator modulo the public prime p. Suppose that y is an escrowed public key. This insures that it can't be used for unescrowed encryptions. But, now the escrow authorities can forge signatures. Suppose that y isn't escrowed. Then signatures can't be forged by the escrow authorities, but y now consititues a shadow public key. Note that the same situation occurs with DSA, the Schnorr digital signature algorithm, and the ElGamal variants of Nyberg and Rueppel (K. Nyberg, R. Rueppel, "Message Recovery for Signature Schemes Based on the Discrete Logarithm Problem", Eurocrypt '94, pages 182–193, Springer-Verlag, 1994).

Now consider the RSA digital signature algorithm (U.S. Pat. No. 4,405,829 to Rivest et al.). Recall that in RSA n is the product of two large primes p and q. e is a public value such that gcd(e,(p–1)(q–1))=1. e and n are the user's public verification keys, and the inverse of e mod (p–1)(q–1) is the user's private signing key. It is simple enough to revise RSA key generation to preclude shadow public key abuse. It remains to consider the aspects of the digital signature algorithm. Suppose that n is escrowed. It follows that the escrow authorities can forge signatures. Suppose that n is not escrowed. It is clear then that the escrow authorities can't forge, but n is a shadow public key. Thus RSA is subject to the same dichotomy as the discrete log based systems. This abuse applies also to the other algorithms based on the difficulty of factoring. For example, consider Esign (U.S. Pat. No. 4,625,076 to Okamoto et al.). In Esign, $n=p^2q$. It is possible to do RSA like encryptions and decryptions using such a modulus.

In Fiat-Shamir (U.S. Pat. No. 4,748,668 to Shamir et al.), n is the product of two primes and none of the users know the factorization of n. To generate a public key, a user generates k different quadratic residues $v_1, v_2, \ldots, v_k$ modulo n. This vector is the public key. The scheme therefore succumbs to the following shadow public key attack. The user's agree on a value (or a set of values) g to be the base for the group $Z_n^*$ (hopefully it generates a large subgroup). To generate $v_1$ for a public key, a malicious user chooses w at random and sets $v_1 = g^{2w}$ mod n. Thus, $v_1$ is a quadratic residue, and a shadow public key for ElGamal mod n. The shadow private key is 2w.

To the best of our knowledge all digital signature algorithms aside from Okamoto '92 (T. Okamoto, "Provably Secure and Practical Identification Schemes and Corresponding Signature Schemes", CRYPTO '92, pages 31–53, Springer-Verlag, 1993) fail immediately when viewed in light of the needs for a satisfactory digital signature infrastructure. Recall that in Okamoto, the public verification key is $v=g_1\char`\^(-s_2)*g_2\char`\^(-s_2)$ mod p. The symbol ^ denotes exponentiation, hence a^b is a raised to the b power. Here $g_1$ and $g_2$ have order q modulo the public prime p. The values for $g_1, g_2$, and q are also public. The private key is $(s_1,s_2)$. Both $s_1$ and $s_2$ are chosen randomly modulo q. Okamoto is based on the representation problem modulo p.

To sign a message m in Okamoto, we choose two values $r_1$ and $r_2$ randomly mod q. We then compute $e=H(g_1\char`\^(r_1)*g_2\char`\^(r_2)$ mod p,m). Here H is a one-way hash function. We then compute $y_1=r_1+es_1$ mod q and $y_2=r_2+es_2$ mod q. The signature is the triple $(e,y_1,y_2)$. To verify the signature we check that $e=H(g_1\char`\^(y_1)*g_2\char`\^(y_2)*v^e$ mod p,m).

At first sight it seems like Okamoto is a good candidate for the setting of a national PKI for signatures, which is to be used alongside an escrowed PKI. For, suppose we don't escrow v. Then the escrow authorities can't forge signatures. But, then we need to insure that v cannot be used as a shadow public key. In fact, we need to show that any key based on the representation problem with $g_1$ and $g_2$ can't be used as an encryption public key. To see this, note that the quantity $g_1\char`\^(y_1)*g_2\char`\^(y_2)*v^e$ mod p is in fact just $g_1\char`\^(r_1)*g_2\char`\^(r_2)$ mod p. Hence, a modular exponentiation with two bases is displayed during signature verification. Now suppose that there is a public key encryption algorithm for public keys with representations using two bases. Since Okamoto is extendible to three or more bases, maybe there is no encryption algorithm if the representation uses three bases, or four bases, etc.

In fact, there is a public key algorithm that uses public keys based on the representation problem with any number of bases. To public key encrypt a message m using v as in Okamoto, we do the following.

1. choose k randomly from $Z_q$
2. $a=g_1^k$ mod p
3. $b=v^k$ mod p
4. $c=g_2^k*m$ mod p
5. the ciphertext of m is (a,b,c)

To decrypt we compute:

1. $a'=a\char`\^(-s_1)$ mod p which equals $g_1\char`\^(-s_1*k)$ mod p
2. $b'=b/a'$ mod p which equals $g_2\char`\^(-s_2*k)$ mod p
3. $m=c/(b'\char`\^(-1/s_2))$ mod p Note that unlike in ElGamal encryptions, the ciphertext is a triple. This algorithm can be easily extended to handle representations using more bases. The ciphertext is an (m+1)-tuple if m bases are used in the representation of v. Thus, Okamoto and it's exentions using more bases fails to meet the requirements of the system that is needed.

In the pending U.S. patent application entitled "Auto-Recoverable and Auto-Certifiable Cryptosystem with Unescrowed Signing Keys" (A. Young, M. Yung, Ser. No. 08/878,189), a solution was presented that attempted to solve this problem. However, the primary embodiment of that solution, and it's variants, have a drawback that was not addressed. Recall that the solution proposed a three key system which involved a signing private key, a decryption private key, and a public key suitable for public key encryptions and signature verifications. The private signing key and the public verification key are used in a digital signature algorithm that is very similar to the ElGamal digital signature scheme, and its variants. The problem with the system is that in the primary embodiment and it's variants, a signature involves publishing a value which can be used as a shadow public key. For example, in the primary embodiment, the value $a=H(m)(g_1/Y)^{-t} \mod 2q$ is computed as the first part of the signature on m. Yet this quantity can be used as a shadow public key in an ElGamal-like public key cryptosystem where t is the unescrowed decryption key. To see this, note that all users have access to H(m), so they can compute the public key $w=a/H(m) \mod 2q$. The value $(g1/Y)^{-1}$ can be used as the base g" (or generator, if you will) of $Z_{2q}$. The key pair is thus ((w, g", 2q),t), which is an ElGamal public/private key pair in the group $Z_{2q}$. All each malicious collaborator needs to do is publish a single signature to a bulletin board, and retain the unescrowed decryption key. This is a major drawback, since the bulletin board then serves as a shadow public key database, and having it taken down by law-enforcement can be argued to be a violation of the first ammendment in court by the collaborators, in the event that law-enforcment tries to take the bulleten board down. The present invention solves this problem by introducing a digital signature algorithm where no shadow public keys are displayed through the digital signatures that are computed. Indeed, what is needed is a new signature scheme that is secure and does not provide public keys which can be used for unescrowed public key encryption, especially in the context of an escrowed PKI.

Key Recovery Infrastructure with Unescrowed Signatures

The present invention discloses a digital signature mechanism that, unlike all known schemes mentioned above, cannot be used for untappable wire communications. Thus it provides simultaneously for an unescrowed signature scheme and an escrowed encryption scheme. The Auto-Escrowable and Auto-Certifiable solution provides an efficient way to implement a public key infrastructure, thereby allowing privacy for users. The present invention builds on that solution and provides the added functionality of authentication capabilities needed in key escrow environments. Thus users of the present invention can verify the authenticity and origin of message senders.

SUMMARY OF THE INVENTION

In order to provide for the above objective the present invention introduces a new idea in cryptography. The present invention introduces a public key which can be used to verify digital signatures but cannot be used to encrypt data in a way that prevents escrow authorities from decrypting the data. The public key has the usual property that it is intractable to derive the corresponding private key from the public key. The present invention also has the property that the escrow authorities and CA's are unable to forge the signatures of users of the system.

The present invention consists of a key certification process, a signing process, a signature verification process, and a key (or information) recovery process. The key certification process can be broken down into two functions which are key generation, and key verification. In the key generation process, a public key, the corresponding private signing key, and information proving that the keys were generated properly is output. In the key certification process, the user transmits this information to the certification authorities (CA) (or registration authority, which is often part of the CA). The certification authority takes this information, processes it, and decides to either publish the public key or not. If the verification information indicates that the keys were generated properly using the key generation algorithm, the certification authority publishes the users public key. Otherwise, the users request for certification is rejected, and the CA may take subsequent action which may include informing the user of this. In the prefered embodiment, public keys that are properly verified by the CA are digitaly signed by the CA and a digital certificate from this information is formed. A public key together with a CA's signature on a string that contains the public key constitutes a certified public key. It is the public key and/or the digital certificate that is made available to other users by the CA. User's sign messages and verify messages in the same manner as in typically digital signature schemes. In the recovery process, information that is encrypted using the public signature verification key of a user is decrypted using information that was sent to the CA during key certification. This may be done without any special authorization, since the public key is only supposed to be used for digital signature verification (another infrastructure should be devoted to ensuring confidentiality, if confidentiality is needed). The method by which the CA certifies and publicizes keys may differ according to the numerous methods available in the art. There are many ways for the CA to act, the ways we adopt in the current description is merely illustrative and there are other variations that are known to the skilled in the art whose implementations does not differ from the current invention.

The present invention is useful in any environment that requires messages to be verifiably authentic. Such environments arise in law enforcement nationally and internationally, in the business sector, in secure file systems, etc. The present invention may involve recovery agents. The present invention is also directly extendable to authentication that is conducted via the use of interactive identification protocols by methods known to those skilled in the art.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The invention does not require changes in communication protocols used in typical unescrowed PKI's (e.g., session key establishment, key distribution, secure message transmission, etc.). The invention is therefore compatible with typical PKI's. The present invention thus provides a very efficient way of allowing for digital signatures.

THE DRAWING

The present invention will be described with reference to the accompanying FIGS. 1–7.

Figure 4:
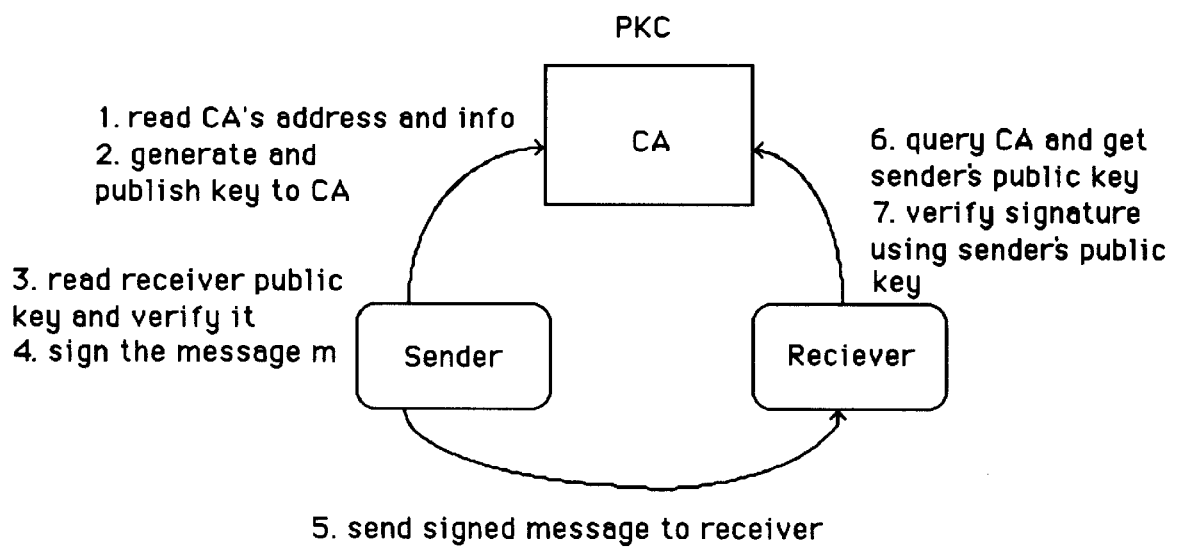
Figure 5:
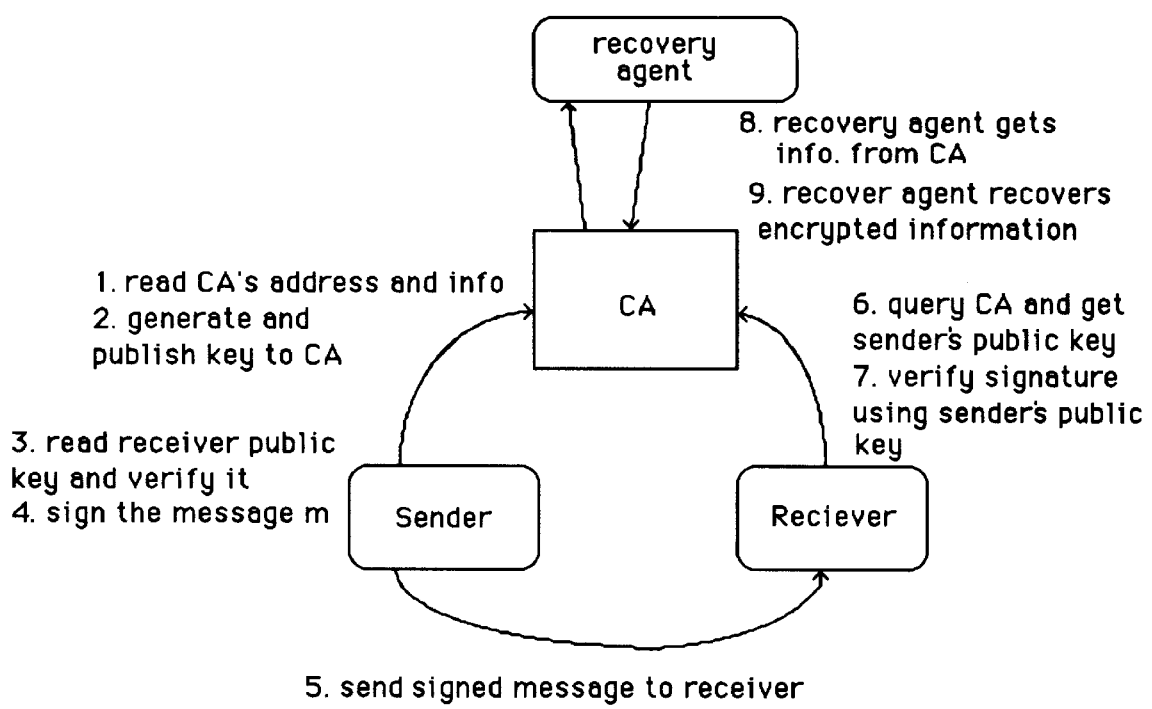

FIG. 4 describes a generic digital signature system and its main components and operations FIG. 5 describes the present invention.

Figure 6:
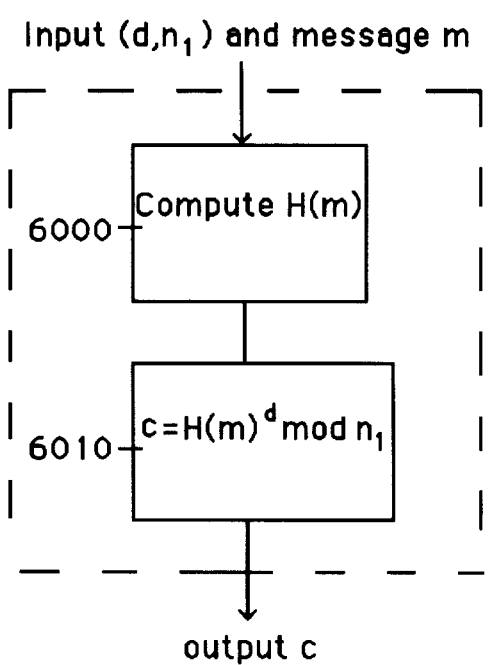

FIG. 6 describes the digital signing process

Figure 7:
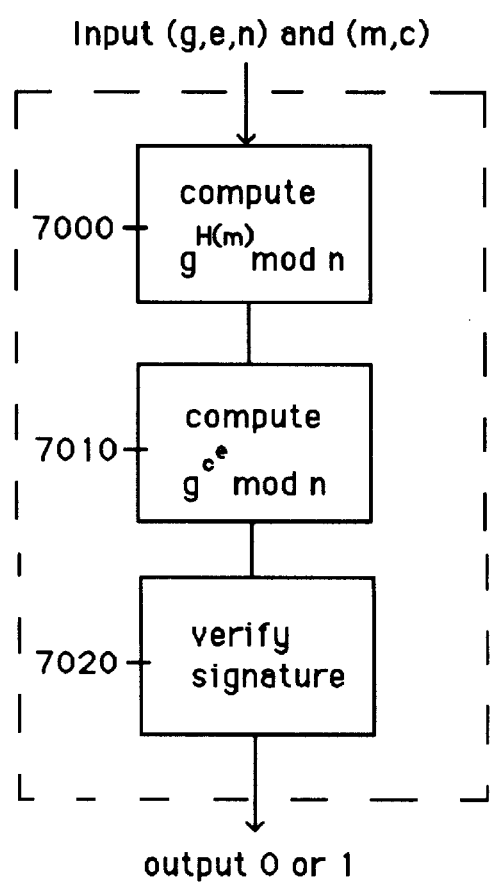

FIG. 7 describes the digital signature verification process

DESCRIPTION OF THE INVENTION

The invention describes a mechanism that can be performed in conjunction or parallel with the generation of public keys for encryptions which may be escrowed or recoverable. For example the auto-recoverable auto-certifiable systems of Young and Yung (pending U.S. Ser. No. 08/864,839). This art is incorporated here by reference. The rest of the description will describe the signature part of the system which is used to authenticate users and users in association with messages they send. It is obvious to those skilled in the art that a signature function and its public verification functions can have many uses and applications, we do not further specify these potential uses of the signature component we describe herein.

Figure 1:
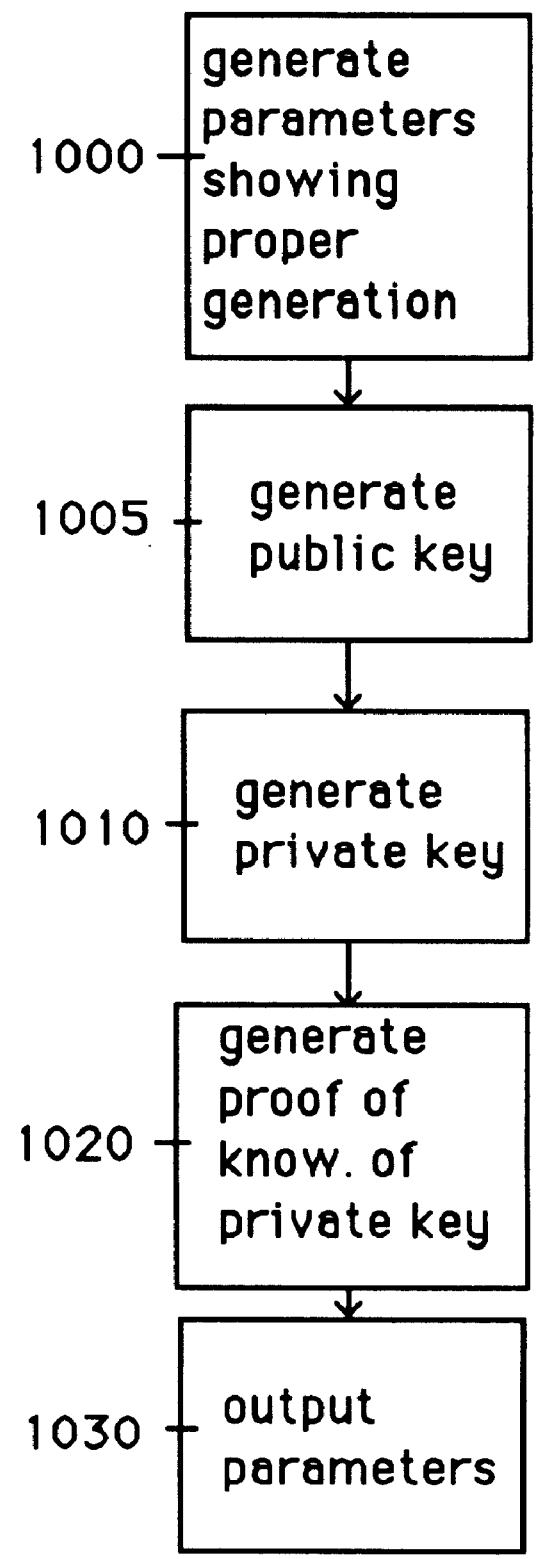
FIG. 1 is a flow chart of the basic steps of the process of generating a public key, the private signing key, and the information that shows that the keys were generated properly.

We will now describe the key generation algorithm that is followed by the users of the system. This process is depicted in FIG. 1. Let e>2 be a small prime (e.g., e=3, 5, 7, etc.). Let M be a security parameter. Choose M/2 bit numbers s and s' randomly, and choose M/2 bit primes $p_1$, $p_2$, $q_1$, and $q_2$. Let $\phi$ denote euler's totient function. These primes adhere to the following mathematical constraints for proper system operation:

1. Each of $p_1-1$, $q_1-1$, $p_2-1$, and $q_2-1$ have a large prime in their factorization.
2. $\gcd(e,(p_1-1)(q_1-1)(p_2-1)(q_2-1))=1$.
3. There exists a $M_1$ bit (e.g., $M_1=31$) odd value $t_1$ s.t. $p=2t_1p_1q_1+1$ is prime and s.t. $\gcd(e,\phi(t_1))=1$.
4. There exists a $M_1$ bit odd value $t_2$ s.t. $q=2t_2p_2q_2+1$ is prime and s.t. $\gcd(e,\phi(t_2))=1$.

We incorporate $t_1$ and $t_2$ in finding p and q to make key generation fast. To provide protection against shadow public key abuse, the following additional constraints are needed to reduce subliminal leakage:

1. $H_1(s)$ (or $H_1(s)+1$, see below) is the same as the upper half of the bits in the bit representation of $p_1q_1$.
2. $H_1(s')$ (or $H_1(s')+1$) is the same as the upper half of the bits in the bit representation of $p_2q_2$.

To accomplish step 1, the algorithm used in the SETUP attack against RSA keys with an obvious modification is performed (A. Young, M. Yung, "Kleptography: Using Cryptography Against Cryptography", Eurocrypt '97, section 5, pages 62–74, Springer-Verlag, 1997). Thus, either $H_1(s)$ is the upper order bits, or $H_1(s)+1$ is the upper order bits due to a borrow bit being taken. Here $H_1$ is a suitable one-way hash function. This step is to avoid the leakage of M/2 bits in the composite $p_1q_1$. However, using this approach, we need to perform trial divisions on $q_1-1$ and insure that the resulting value is prime. The same procedure is used to accomplish step 2. The values p, q, $t_1$, and $t_2$ are found to satisfy the above. The key generation algorithm then performs the following computations:

1. Compute the smallest values $s_1$ and $s_2$ that make $g_1=H_2(s,s',s_1)$ a generator mod p and $g_2=H_3(s,s',s_2)$ a generator mod q. We insist that $s_1$ and $s_2$ are, say at most 16 bits in length.
2. Chinese remainder $g=g_1$, mod p with $g=g_2$ mod q to get g mod pq (g then has order $\lambda(n)$, see (Rosen, K. R., "Elementary Number Theory and its Applications", 3rd edition, Theorem 8.21, page 313, Addison Wesley, 1993).
3. n=pq
4. $n_1=2t_1p_1q_1t_2p_2q_2$
5. $d=(1/e) \mod \phi(\phi(n))$
6. compute $T_1$ to be a non-interactrive zero-knowledge proof of knowledge of the factorization of $(p-1)/2t_1$.
7. compute $T_2$ to be a non-interactive zero-knowledge proof of knowledge of the factorization of $(q-1)/2t_2$.

To prove knowledge of the factorization of a number u into two distinct prime factors, one can query a random oracle hash function on this number u to generate enough random numbers mod u and show a square root of at least ⅜ of these random numbers.

$H_2$ and $H_3$ are suitable one-way hash functions, where the range of $H_2$ is $Z_p$ and the range of $H_3$ is $Z_q$. Number (2) above is the last part of step 1000 in FIG. 1. Number (3) above corresponds to step 1005 in FIG. 1. Numbers (4) and (5) above correspond to step 1010 in FIG. 1. Note that $n_1=\lambda(n)$ is the carmichael function $\lambda$ of n. The public verification key is (g,e,n). The private signing key of the user is $(d,n_1)$. Numbers (6) and (7) above correspond to step 1020 in FIG. 1. Note that $T_1$ and $T_2$ can optionally be conducted interactively. To register the public verification key with the CA, the user sends to the CA the tuple $(s,s',p,q,t_1,t_2,s_1,s_2,e,T_1,T_2)$. The values $s_1$ and $S_2$ must be sent, since we know of no way for the CA to verify that $g_1$, generates $Z_p$ and that $g_2$ generates $Z_q$. This corresponds to step 1030 in FIG. 1. To those skilled in the art, steps 6 and 7 above can be replaced by an interactive protocol between the user and the CA.

Figure 2:
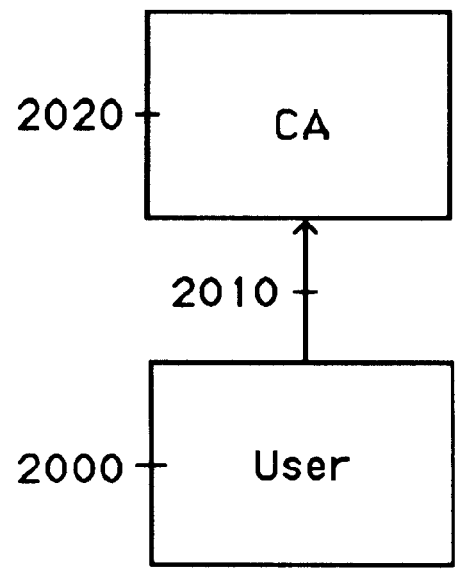
FIG. 2 is a data flow diagram of the process of certifying a key using the invention.

Step 2000 in FIG. 2 is the user generating the key pair and forming $(s,s',p,q,t_1,t_2,s_1,s_2,e,T_1,T_2)$. Step 2010 depicts the user sending this string of information to the CA. Step 2020 in FIG. 2 is the CA verifying this string of information. We will now describe this process in detail. The CA receives $(s,s',p,q,t_1,t_2,s_1,s_2,e,T_1,T_2)$. The CA computes $v_1$ to be $(p-1)/2t_1$ and $v_2$ to be $(q-1)/2t_2$. The CA then sets z to be the upper half of the bit representation of $v_1$, and z' to be the upper half of the bit representation of $v_2$. The CA computes $g_1$ and $g_2$ in the same way as the user. The CA finds g by Chinese remainding $g_1$ mod p with $g_2$ mod q. The CA also computes n=pq. Let a|b denote that a divides b evenly. Let a^b denote a raised to the b power. The CA verifies all of the following things:

1. p is prime, $t_1$ is odd and the appropriate size, $t_1|p-1$, s is M/2 bits, etc.
2. that pq is hard to factor (e.g., |p-q| is large, etc.)
3. $H_1(s)$ or $H_1(s)+1$ equals z and also checks that $H_1(s')$ or $H_1(s')+1$ equals z'.
4. $g_1\hat{}((p-1)/2)\neq 1$, $g_1\hat{}((p-1)/t_1)\neq 1$, $g_1\hat{}((p-1)/v_1)\neq 1$ all mod p and that $g_2\hat{}\{(q-1)/2\}\neq 1$, $g_2\hat{}((q-1)/t_2)\neq 1$, $g_2\hat{}((q-1)/v_2)\neq 1$ all mod q (hence, the CA is sure that g generates a large subgroup).
5. checks that $T_1$ and $T_2$ are valid.

Step 5 convinces the CA that the user knows the signing private key. If all the verifications pass then the CA publishes (g,e,n) as the user's public verification key. If an escrowed PKI is also in use, then (p,q) is forwarded to the escrow authorities to permit key recovery. Either way, the CA may opt to store all of the information received by users for future purposes.

Figure 3:
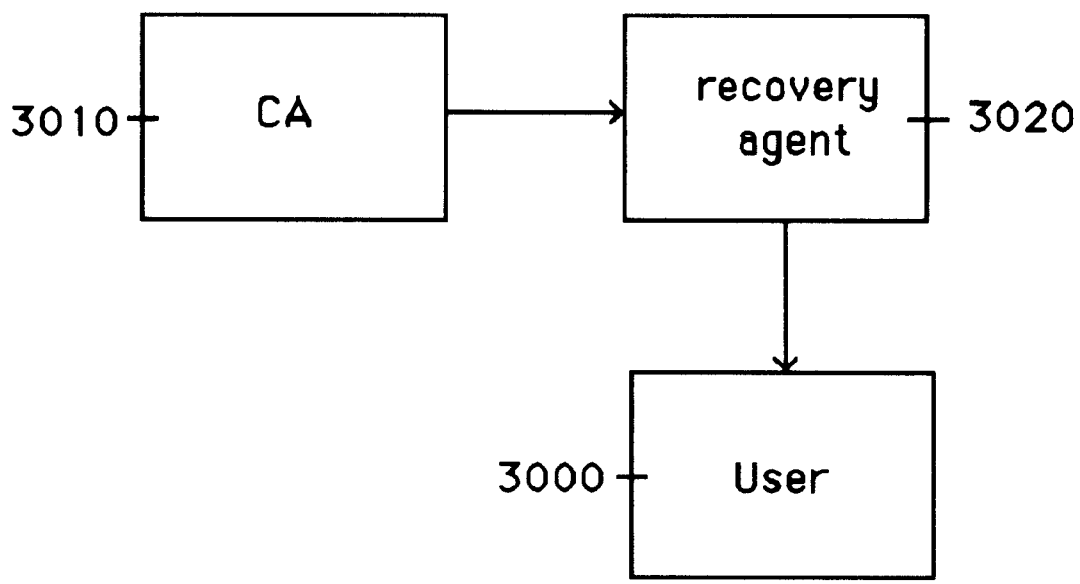
FIG. 3 is a data flow diagram of the process of recovering information enciphered using the public verification key.

In the event that the law-enforcement (or whatever body is in charge of investigating rogue use of n) suspects that a given users modulus n was used to encipher data using a public key encryption algorithm, the factors (p,q) of n are used to recover the encrypted information. This process is depicted in FIG. 3. In step 3000 of FIG. 3. The recovery agent (which may be law enforcment) obtains the enciphered communications of the suspected criminal. In step 3010, the recovery agent obtains the factors (p,q) of n from the CA. Here n is the modulus corresponding to the public key of the message recipient. In step 3020, the recovery agent deciphers the communications using the factors (p,q) of n. The encrypted information may be a session key that is needed to decrypt the actual criminal communications. Hopefully, law-enforcement knows exactly what algorithm was used to encipher the information.

FIG. 4. depicts a typical public key cryptosystem (PKC) when used for digital signatures. In step 1 a user of the system reads the CA's adress and other information. In step 2, the user generates a public/private key pair and gives the public key to the CA. Step 3 corresponds to normal system operation. In this step, a sender signs a message using the sender's own private key, as depicted in step 4. The sender sends the message along with the signature to the receiver in step 5. In step 6, the receiver obtains the message and signature and obtains the public key of the sender from the CA. In step 7, the receiver verifies the authenticity of the received message using the message, the signature, and the sender's public key. Variations on usages of signatures and technologies built upon the availability of digital signatures are applicable.

FIG. 5 describes our digital signature system. Steps 1 through 7 are fundamentally unchanged from FIG. 4. Yet, in our system, if the public key of the sender is used to encipher data, a recover agent can recover the information. This process is depicted in steps 8 and 9. In step 8, the recovery agent gets recovery information from the CA, corresponding to the factors of the senders public modulus n. In step 9 the recovery agents obtains and deciphers the message that is suspected to have been enciphered using the public key of the sender. Art describing the operation of the recovery agents is described in publications that pertain to the specific encryption algorithm used by the malicious user (e.g., RSA in U.S. Pat. No. 4,405,829).

The signing algorithm is depicted in FIG. 6. To sign an arbitrary message m, the user computes $g^{H(m)}$ mod n as depicted in step 6000 of FIG. 6. Having computed this quantity, the signer proceeds to step 6010 and computes $c=(H(m))^d$ mod $n_1$. Here H is a random oracle (e.g., implemented via one-way hash functions). c is the output of the signing algorithm, and is the signature on m.

FIG. 7 depicts the process that is followed to verify the authenticity of a signature c on message m. In an alternate embodiment, the signature c includes redundancy and/or randomness in addition to the message being signed. In step 7000 of FIG. 7, the verifier computes $g^{H(m)}$ mod n. In step 7010 the verifier computes $g^{\hat{}}(c^e)$ mod n. In step 7020 the verifier checks that:

$$g^{H(m)} \text{ mod } n = g^{\hat{}}(c^e) \text{ mod } n$$

If this equality holds, then 1 is output, indicating that c is a valid signature on m. Otherwise, zero is output, indicating that c is not a valid signature on m. Note that if, for example, e=3, the only way to verify the signature is to compute the right side as follows:

$$g^{\hat{}}(c^e) \text{ mod } n = ((g^c \text{ mod } n)^c \text{ mod } n)^c \text{ mod } n$$

This is necessary because the modulus in the exponent is unknown to the verifier, thus the verifier cannot first compute $c^3$ mod $n_1$ and then use this as the exponent for g. Note that if e were a value other than 3, we would simply perform e modular exponentiations to compute the right side of the verification equation. The reason we insist e is small (which is of size polynomial in the logarithm of the size of n) is therefore to make signature verification efficient.

This system constitutes a nested trapdoor system involving three domains, $F_1$, $F_2$, and $F_3$. In particular, domain $F_3$ is the integers mod $\phi^2(n)$, $F_2$ is the integers mod $\lambda(n)$, and $F_1$ is the integers mod n. If another encryption key is available (namely, the public encryption key of the receiver of the signature), it can be used to encrypt the message and signature being sent.

Thus, there has been described a new and improved unescrowed auto-certifiable signature infrastructure which allows for digital signatures, its variants, and applications. It is to be understood that the prefered embodiment is merely illustrative of some of the many specific embodiments which represent applications of the principles and paradigms of the present invention. Clearly, numerous and alternate arrangements can be readily devised by those who are skilled in the art without departing from the scope of the present invention.

In a secondary embodiment of the above method, one can view a system where users or other system entities have signature keys and if the CA or key recovery authorities or law enforcement try to impersonate a user, there is a way for the user to prove a-posteriori that forgery.

If retroactive security is acceptable in a system that operates along side an escrowed one, the following simpler solution can be used. By being retroactively secure we mean that under normal system operation, users assume that the escrow authorities will not forge signatures, but if they do forge signatures, then users have a retroactive way of verifying this. This solution has now small sized signatures and efficient signature verification algorithms. In this solution, the user generates two public/private key pairs $(y_1,x_1)$ and $(y_2,x_2)$ and escrows $x_1$ (e.g., as in the pending patent Ser. No. 08/878,189 of Young and Yung). Provided that the CA is convinced that $x_1$ is escrowed and that $y_1$ doesn't contain a shadow public key, the CA chooses a number r randomly and computes $v=H(r,y_2)$. The CA publishes $(y_1,v)$. Here H is a one-way hash function. Note that v has no subliminal channel from the user, hence it has no shadow public key. This value forms a public commitment of $y_2$.

Let c=sig(x,m) be the signature on m using the private key x. To sign a message m, the user computes $c_1$=sig($x_1$,m), and $c_2$'=sig($x_2$,m). The user computes $c_2$=H'($c_2$'). The range of H' could be say $\{0,1\}^{64}$. The signature is ($c_1,c_2$). Alternatively, $c_2$ can be a parameter in computing $c_1$, extending the message m. To verify a signature a user checks that $c_1$ is the proper signature on m using $y_1$ . The value $c_2$ goes unchecked under normal system operation. If a user suspects that the escrow authorities forged a signature, the user can demand that the signer send him $y_2$. Once $y_2$ is obtained, the verifier checks that $v=H(r,y_2)$, $c_2$' is the signature on m using $y_2$, and checks that $c_2$=H'($c_2$'). If equality does not hold, it constitutes a proof of forgery. The reason this is only a partial solution is that to check if the escrow authorities forged the signature, a shadow public key $y_2$ is sent to the verifier. Also, a malicious user could choose $C_2$ to leak information, hoping it will never be verified (hence, why we restrict it to being small, say 64 bits). However, for many applications this may suffice.

What we claim is:

1. A method for generating a public key and a proof that the key was generated by a specific algorithm comprising the steps of:

the user's system generating a random string of bits;

the user running a key generation algorithm to get a private signing key, and a corresponding public key using the random string, where said public key can be used to verify digital signatures;

the user constructing a proof being a string of bits which provides confidence to another entity that said key was generated properly by the specified algorithm;

the user constructing a proof which involves the user engaging in a protocol with said another entity whereby the said another entity repeatedly sends a challenge string and said user sends a response based on the challenge and the public and private keys such that the public availability of said challenges and responses does not compromise the private keys, but at the same time provides confidence to said another entity that said user know's the private key corresponding to the public key that was generated.

2. A method as in claim 1 where said public key is made available publicly.

3. A method for registering users into a Public Key Infrastructure (PKI) such that a user and his key is registered only upon verifying that the key was generated according to a specific algorithm comprising the steps of:

the user generating the keys as in claim 1, and in addition:
the user sending to the registration authority the public key and a proof of the fact that the said user knows the corresponding private key and that both keys were generated according to a specific algorithm;

if the registration authority is convinced of the validity of said fact and of the user's identity, then a certification authority issues a certificate for user's said public key and publicizes said public key.

4. A method as in claim 3 wherein the registration authority, after verifying the validity of said public key, publishes said public key together with a string which identifies the user in the system according to the system's identification convention.

5. A method as in claim 4 wherein the registration authority certifies the public key of said user by signing at least user's said public key using said registration authority's private key.

6. A method as in claim 3 with the further steps of:

user employing their private keys corresponding to registered public key for signing messages or authenticating themselves;

user employing receiver's public keys for encrypting messages sent to said receiver.

7. A method as in claim 3 with the further step of the user generating and registering an additional encryption key for confidentiality.

8. The method as described in claim 7 where user's encryption key or information encrypted under it can be monitored by key recovery agents.

9. The method described in claim 8, with the further provision that said key recovery agent or anyone else but the said user cannot produce valid signatures of said user to impersonate the user.

10. The method described in claim 8, with the further provision that said key recovery agent or anyone else but the said user cannot forge valid signatures of said user without said user being able to prove this forgery.

11. A method as in claim 8 with the further step of: characterizing the user's activities as unlawful if the agent is unable to monitor the user's communications.

* * * * *